United States Patent [19]
Baber

[11] Patent Number: 5,725,265
[45] Date of Patent: Mar. 10, 1998

[54] AIR BAG SYSTEM FOR VEHICLE BUMPERS

[76] Inventor: Jeff Baber, 180 Baber St., Heflin, Ala. 36264

[21] Appl. No.: 783,357

[22] Filed: Jan. 16, 1997

[51] Int. Cl.$^6$ ............................................. B60R 19/20
[52] U.S. Cl. ...................... 293/107; 293/117; 280/728.3
[58] Field of Search ......................... 293/107, 1, 117; 280/728.2, 728.1, 728.3, 737

[56] References Cited

U.S. PATENT DOCUMENTS

| | | | |
|---|---|---|---|
| 3,588,142 | 6/1971 | Gorman | 280/736 |
| 3,656,790 | 4/1972 | Truesdell | 293/107 |
| 3,656,791 | 4/1972 | Truesdell | 293/107 |
| 3,708,194 | 1/1973 | Amit | 293/107 X |
| 3,822,076 | 7/1974 | Mercier et al. | 293/107 |
| 4,176,858 | 12/1979 | Kornhauser | 293/107 X |
| 4,869,538 | 9/1989 | Presley | 293/107 |
| 5,106,137 | 4/1992 | Curtis | 293/107 |

FOREIGN PATENT DOCUMENTS

| | | | |
|---|---|---|---|
| 2017465 | 11/1971 | Germany | 293/107 |
| 168746 | 7/1987 | Japan | 293/107 |
| 155854 | 6/1990 | Japan | 293/107 |
| 8903328 | 4/1989 | WIPO | 293/107 |

*Primary Examiner*—Joseph D. Pape

[57] ABSTRACT

A new Air Bag System For Vehicle Bumpers for absorbing the impact of a collision, thus minimizing damage and preventing serious injuries. The inventive device includes a containment member having a hollow interior and being securable to the front or the rear of a vehicle, and an air bag enclosed within the hollow interior of the containment member, wherein the air bag is inflatable and deployable when the containment member is impacted by an object, such as another vehicle. An inflation system is provided for inflating and deploying the air bag outwardly from the containment member and a triggering system is provided for triggering the inflation system when the containment member is impacted. A control system is operably connected to the triggering system, the inflation system, and the air bag for controlling inflation and deployment of the air bag.

8 Claims, 3 Drawing Sheets

AIR BAG SYSTEM FOR VEHICLE BUMPERS

BACKGROUND OF THE INVENTION

1. Field of the Invention

The present invention relates to vehicle bumpers and more particularly pertains to a new Air Bag System For Vehicle Bumpers for absorbing the impact of a collision, thus minimizing damage and preventing serious injuries.

2. Description of the Prior Art

The use of vehicle bumpers is known in the prior art. More specifically, vehicle bumpers heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle bumpers include U.S. Pat. No. 4,869,538; U.S. Pat. No. 5,431,463; U.S. Pat. No. 5,106,137; U.S. Pat. No. D278,894; U.S. Pat. No. 4,518,183 and U.S. Pat. No. 4,099,759.

While these devices fulfill their respective, particular objectives and requirements, the aforementioned patents do not disclose a new Air Bag System For Vehicle Bumpers. The inventive device includes a containment member having a hollow interior and being securable to the front or the rear of a vehicle, and an air bag enclosed within the hollow interior of the containment member, wherein the air bag is inflatable and deployable when the containment member is impacted by an object, such as another vehicle. An inflation means is provided for inflating and deploying the air bag outwardly from the containment member and a triggering means is provided for triggering the inflation means when the containment member is impacted. A control means is operably connected to the triggering means, the inflation means, and the air bag for controlling inflation and deployment of the air bag.

In these respects, the Air Bag System For Vehicle Bumpers according to the present invention substantially departs from the conventional concepts and designs of the prior art, and in so doing provides an apparatus primarily developed for the purpose of absorbing the impact of a collision, thus minimizing damage and preventing serious injuries.

SUMMARY OF THE INVENTION

In view of the foregoing disadvantages inherent in the known types of vehicle bumpers now present in the prior art, the present invention provides a new Air Bag System For Vehicle Bumpers construction wherein the same can be utilized for absorbing the impact of a collision, thus minimizing damage and preventing serious injuries.

The general purpose of the present invention, which will be described subsequently in greater detail, is to provide a new Air Bag System For Vehicle Bumpers apparatus and method which has many of the advantages of the vehicle bumpers mentioned heretofore and many novel features that result in a new Air Bag System For Vehicle Bumpers which is not anticipated, rendered obvious, suggested, or even implied by any of the prior art vehicle bumpers, either alone or in any combination thereof.

To attain this, the present invention generally comprises a containment member having a hollow interior and being securable to the front or the rear of a vehicle, and an air bag enclosed within the hollow interior of the containment member, wherein the air bag is inflatable and deployable when the containment member is impacted by an object, such as another vehicle. An inflation means is provided for inflating and deploying the air bag outwardly from the containment member and a triggering means is provided for triggering the inflation means when the containment member is impacted. A control means is operably connected to the triggering means, the inflation means, and the air bag for controlling inflation and deployment of the air bag.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Air Bag System For Vehicle Bumpers apparatus and method which has many of the advantages of the vehicle bumpers mentioned heretofore and many novel features that result in a new Air Bag System For Vehicle Bumpers which is not anticipated, rendered obvious, suggested, or even implied by any of the prior art vehicle bumpers, either alone or in any combination thereof.

It is another object of the present invention to provide a new Air Bag System For Vehicle Bumpers which may be easily and efficiently manufactured and marketed.

It is a further object of the present invention to provide a new Air Bag System For Vehicle Bumpers which is of a durable and reliable construction.

An even further object of the present invention is to provide a new Air Bag System For Vehicle Bumpers which is susceptible of a low cost of manufacture with regard to both materials and labor, and which accordingly is then susceptible of low prices of sale to the consuming public, thereby making such Air Bag System For Vehicle Bumpers economically available to the buying public.

Still yet another object of the present invention is to provide a new Air Bag System For Vehicle Bumpers which provides in the apparatuses and methods of the prior art some of the advantages thereof, while simultaneously overcoming some of the disadvantages normally associated therewith.

Still another object of the present invention is to provide a new Air Bag System For Vehicle Bumpers for absorbing the impact of a collision, thus minimizing damage and preventing serious injuries.

Yet another object of the present invention is to provide a new Air Bag System For Vehicle Bumpers which includes a containment member having a hollow interior and being securable to the front or the rear of a vehicle, and an air bag enclosed within the hollow interior of the containment member, wherein the air bag is inflatable and deployable when the containment member is impacted by an object, such as another vehicle. An inflation means is provided for inflating and deploying the air bag outwardly from the containment member and a triggering means is provided for triggering the inflation means when the containment member is impacted. A control means is operably connected to the triggering means, the inflation means, and the air bag for controlling inflation and deployment of the air bag.

Still yet another object of the present invention is to provide a new Air Bag System For Vehicle Bumpers that could be incorporated into new vehicle production or could be installed as an after-market product on existing vehicles.

Even still another object of the present invention is to provide a new Air Bag System For Vehicle Bumpers that is adaptable for use with the rear bumpers of commercial trucks and trailers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
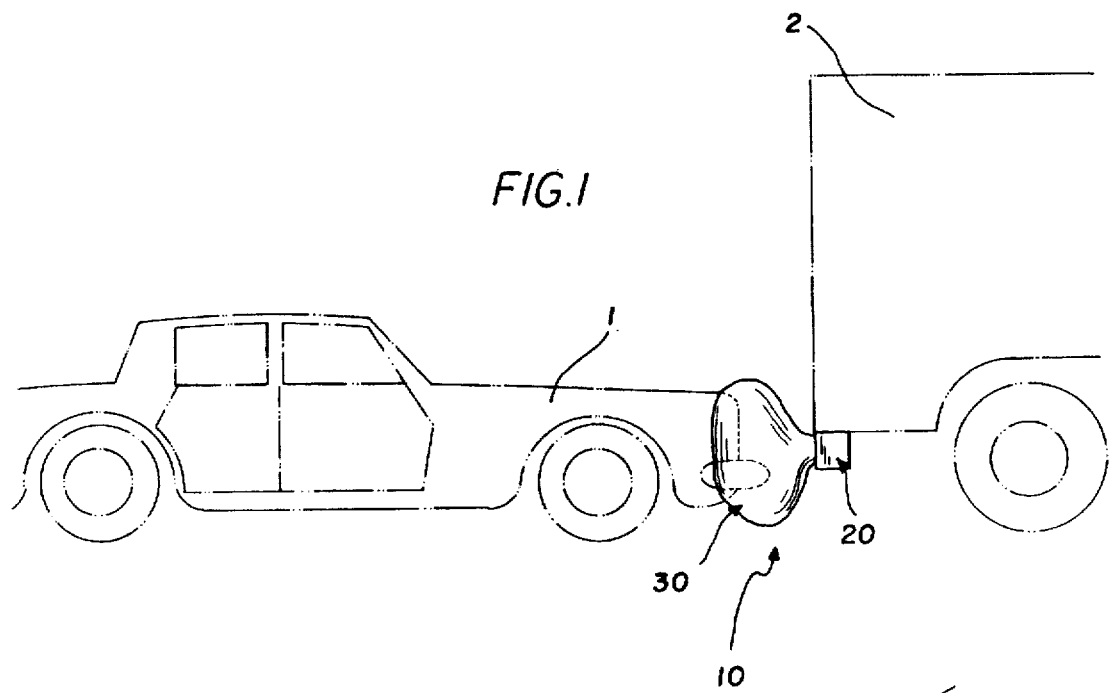
FIG. 1 is an illustration of a new Air Bag System For Vehicle Bumpers deployed according to the present invention.
Figure 2:
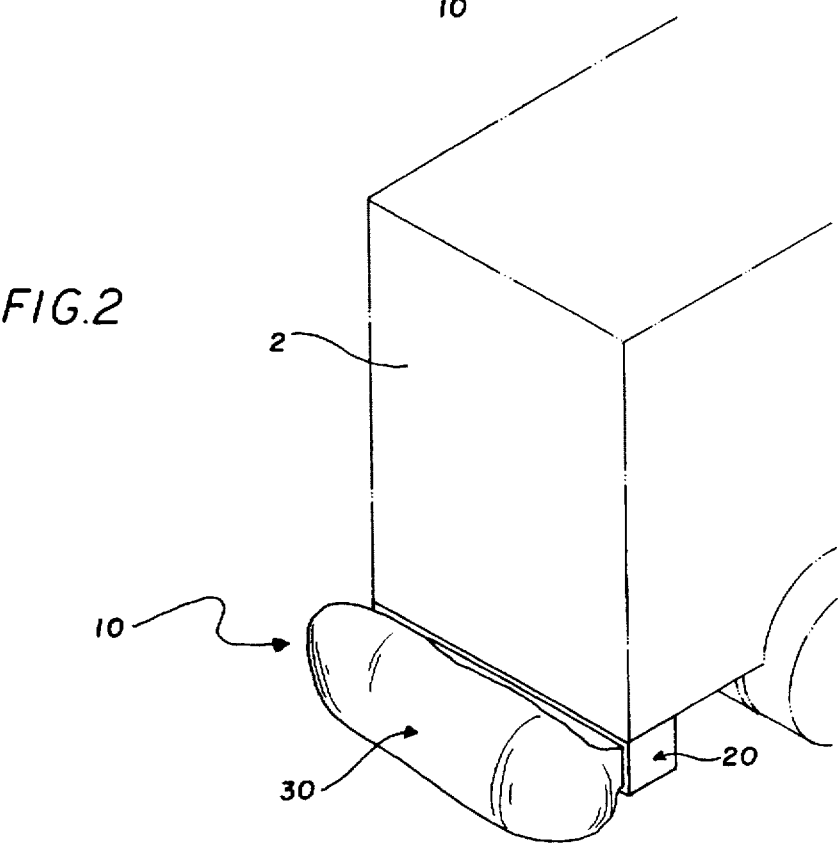
FIG. 2 is a perspective view of the present invention deployed from the rear of a vehicle.
Figure 3:
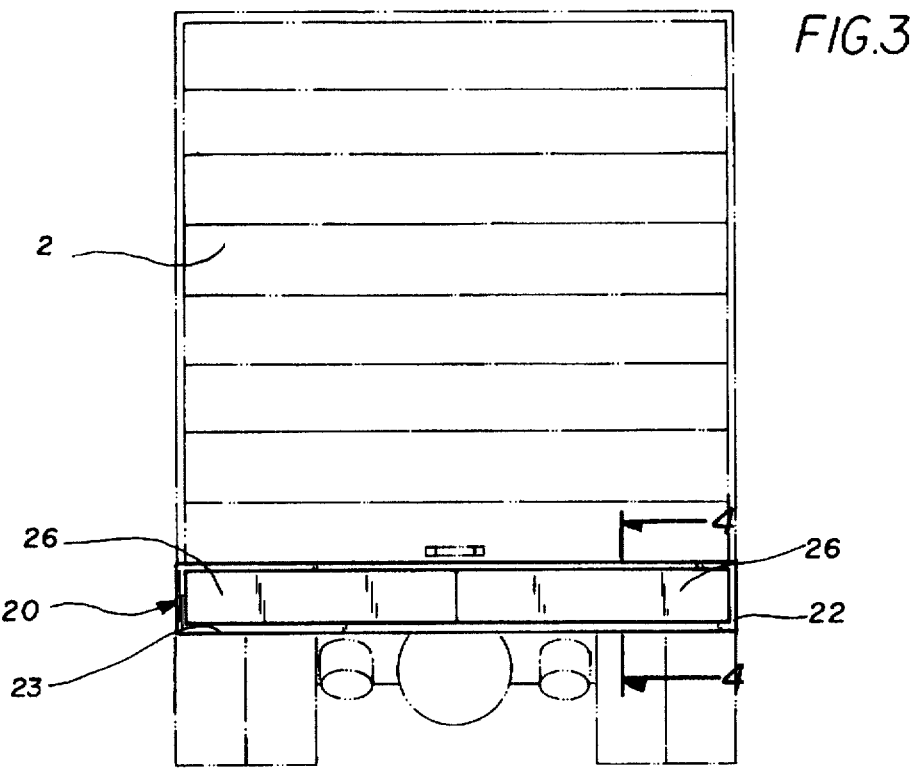
FIG. 3 is a rear view of the present invention installed at the rear of a vehicle.
Figure 4:
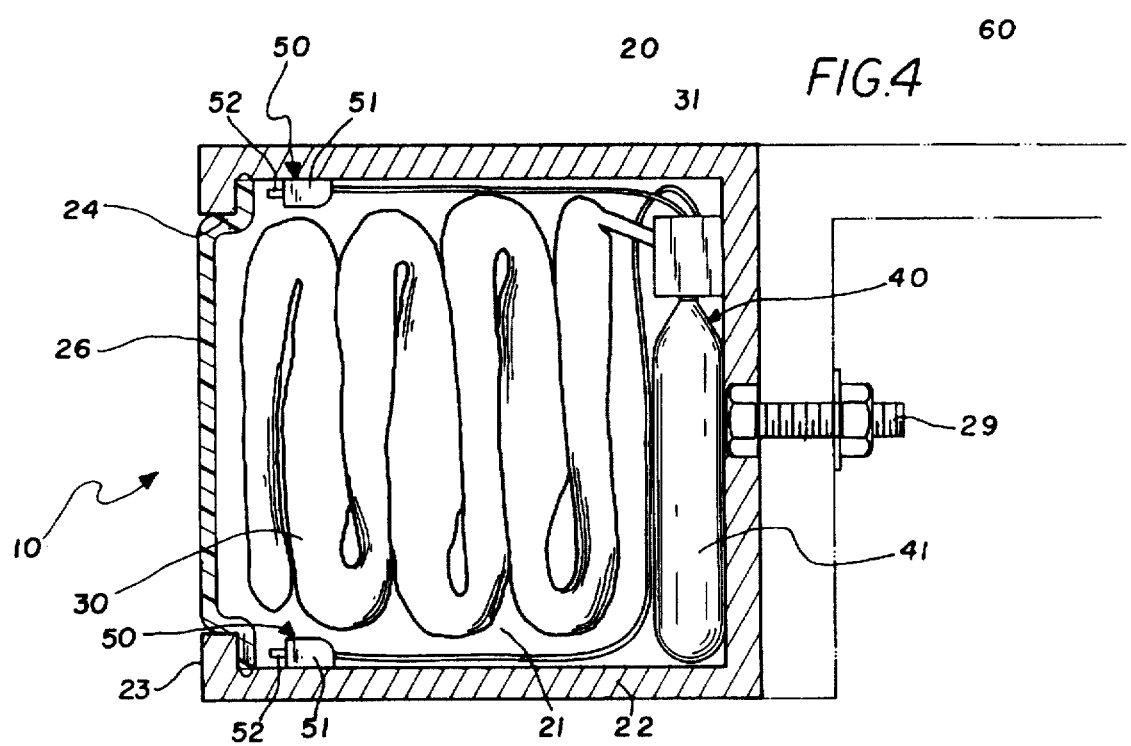
FIG. 4 is a cross sectional view taken along line 4—4 of FIG. 3.

With reference now to the drawings, and in particular to FIGS. 1 through 6 thereof, a new Air Bag System For Vehicle Bumpers embodying the principles and concepts of the present invention and generally designated by the reference numeral 10 will be described.

More specifically, it will be noted that the Air Bag System For Vehicle Bumpers 10 comprises a containment member 20 having a hollow interior 21 and being securable to the front or the rear of a vehicle 2, and an air bag 30 enclosed within the hollow interior 21 of the containment member 20, wherein the air bag 30 is inflatable and deployable when the containment member 20 is impacted by an object, such as another vehicle 1. An inflation means 40 is provided for inflating and deploying the air bag 30 outwardly from the containment member 20 and a triggering means 50 is provided for triggering the inflation means 40 when the containment member 20 is impacted. A control means 60 is operably connected to the triggering means 50, the inflation means 40, and the air bag 30 for controlling inflation and deployment of the air bag 30.

As best illustrated in FIGS. 1 through 4, it can be shown that the containment member 20 comprises an elongated support member 22 having an impact face 23 having an opening 24 therein and an expellable panel 26 fitted within the opening 24 in the impact face 23 and releasably secured to the elongated support member 22. The elongated support member 22 is generally rectangular in shape and has a generally square cross section. The elongated support member 22 is securable to the frame of the vehicle 2 by a fastener 29. As such, the elongated support member 22 functions as a bumper for the vehicle 2.

The air bag 30 is contained within the elongated support member 22 and enclosed by the expellable panel 26. The air bag 30 includes an inlet portion 31 operably connected to the control means 60 wherein the inlet portion 31 provides communication between the air bag 30 and the inflation means 40. The air bag 30 is inflatable and deployable outwardly from the containment member 20 so as to cushion an impact with the containment member 20. When inflated and deployed, the air bag 30 projects out the opening 24 provided in the impact face 23 of the elongated support member 22 and expels the expellable panel 26.

The inflation means 40 comprises a compressed gas source 41 operably connected to the air bag 30 and the control means 60 whereby the compressed gas source 41 is dischargeable into the air bag 30 when the containment member 20 is impacted. Upon impact, the compressed gas source 41 is discharged through the inlet portion 31 of the air bag 30 thereby inflating the air bag 30.

The triggering means 50 comprises an impact switch 51 operably connected to the control means 60 and actuateable when the impact face 23 of the elongated support member 22 is impacted by an object, such as another vehicle 1. The impact switch 51 includes a plunger actuator 52 mounted within the elongated support member 22 adjacent the expellable panel 26 whereby impact with the expellable panel 26 causes the expellable panel 26 to contact the plunger actuator 52 thereby actuating the impact switch 51 which in turn actuates the inflation means 40.

Figure 5:
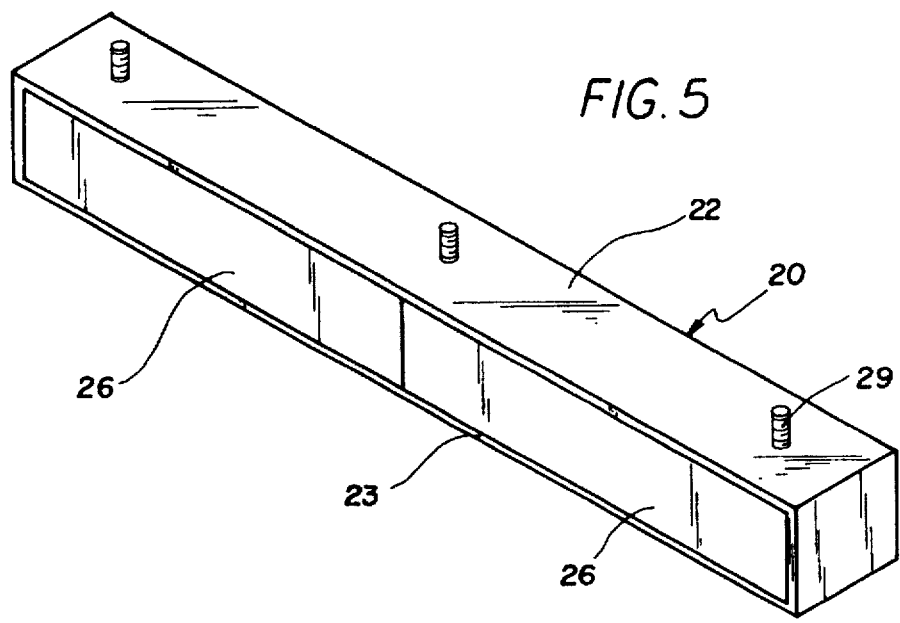
FIG. 5 is an illustration of a second embodiment of the present invention intended for attachment to an existing bumper.
Figure 6:
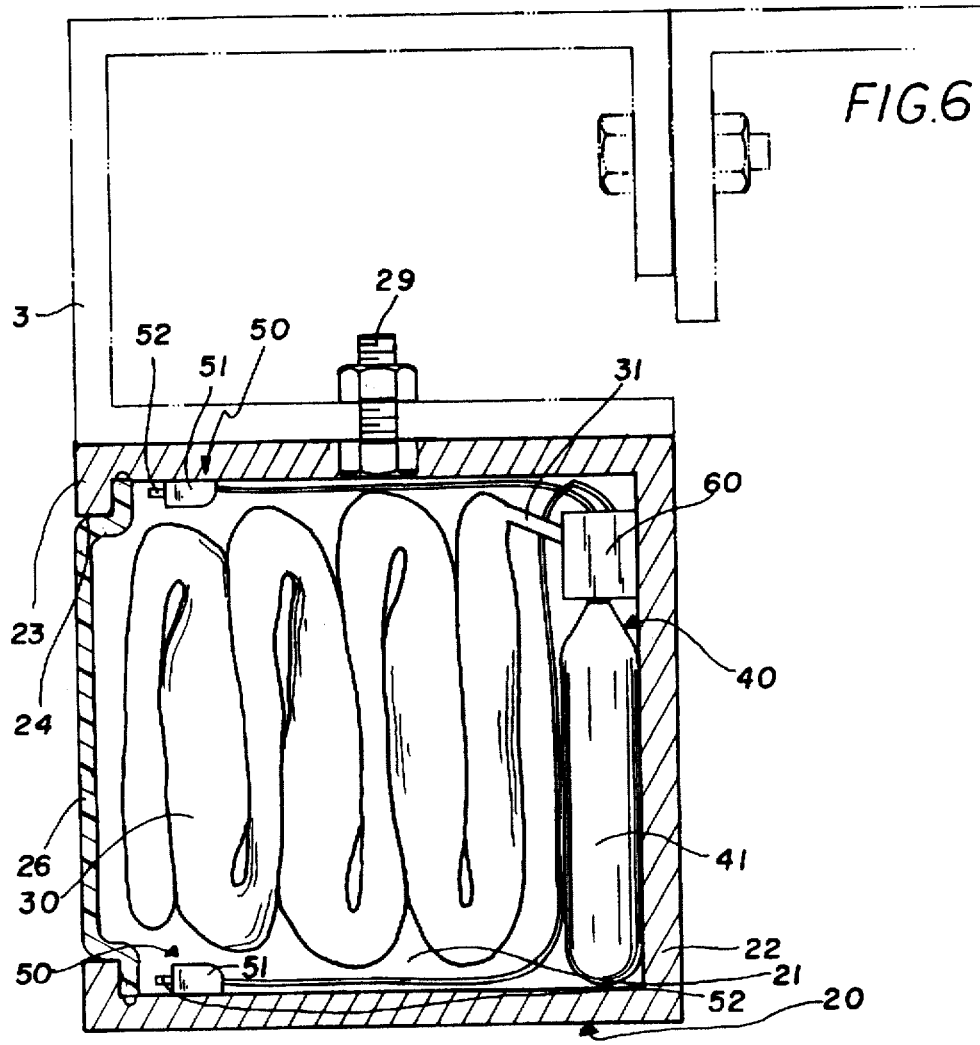
FIG. 6 is a cross sectional view of the second embodiment of the present invention.

As best illustrated in FIGS. 5 and 6, it can be shown that the present invention is adaptable for use as an after-market product wherein the elongated support member 22 is securable to an existing bumper 3 of a vehicle 2.

In use, the containment member 20 is secured to the front or the rear of the vehicle 2 and functions as a bumper for the vehicle 2. When the impact face 23 of the elongated support member 22 is impacted by an object, such as another vehicle 1, the expellable panel 26 resultingly contacts the plunger actuator 52 of the impact switch 51 which, in turn, actuates the inflation means 40. The compressed gas source 41 is then discharged through the inlet portion 31 of the air bag 30 thereby inflating the air bag 30. The air bag 30 is inflated and deployed outwardly from the containment member 20 whereby the air bag 30 projects out the opening 24 provided in the impact face 23 of the elongated support member 22 and expels the expellable panel 26. As such, when the air bag 30 is inflated and deployed, it cushions an impact with the containment member 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An air bag system for a bumper of a vehicle comprising:

a containment member having a hollow interior, said containment member securable to at least one of the front and the rear of said vehicles, said containment member comprising a support member having an impact face having an opening therein, and an expellable panel fitted within said opening and releasably secured to said support member; and a deflated air bag enclosed within said hollow interior of said containment member, said deflated air bag inflatable and deployable outwardly from said containment member when said containment member is impacted whereby said deflated air bag expels said expellable panel.

2. An air bag system for a bumper of a vehicle comprising.

a containment member having a hollow interior, said containment member securable to at least one of the front and the rear of said vehicle, said containment member comprising a support member having an impact face, said impact face having an opening therein, and an expellable panel fitted within said opening in said impact face, said expellable panel releasably secured to said support member;

a deflated air bag enclosed within said hollow interior of said containment member, said deflated air bag inflatable and deployable through said opening outwardly from said support member whereby said deflated air bag expels said expellable panel;

an inflation means for inflating and deploying said deflated air bag outwardly from said containment member;

a triggering means for triggering said inflation means when said containment member is impacted; and a control means operably connected to said triggering means, said inflation means, and said deflated air bag for controlling inflation and deployment of said deflated air bag.

3. The air bag system of claim 2, wherein said inflation means comprises:

a compressed gas source operably connected to said deflated air bag and said control means, said compressed gas source dischargeable into said deflated air bag when said triggering means is actuated.

4. The air bag system of claim 2, wherein said triggering means includes an impact switch operably connected to said control means and actuateable when said containment member is impacted.

5. The air bag system of claim 2, wherein said containment member is securable to an existing bumper of said vehicle.

6. An air bag system for a bumper of a vehicle comprising:

a support member having an impact face and a hollow interior, said impact face having an opening therein, said support member securable to at least one of the front and the rear of said vehicle;

an expellable panel fitted within said opening in said impact face and releasably secured to said support member;

a deflated air bag enclosed within said hollow interior of said support member and enclosed by said expellable panel, said deflated air bag inflatable and deployable through said opening outwardly from said support member whereby said deflated air bag expels said expellable panel;

a compressed gas source operably connected to said deflated air bag, said compressed gas source dischargeable into said deflated air bag, said compressed gas source inflating and deploying said deflated air bag outwardly from said support member; and an impact switch actuateable when said impact face of said support member is impacted, said impact switch operably connected to said compressed gas source whereby said impact switch triggers discharge of said compressed gas source into said deflated air bag when said impact face is impacted.

7. The air bag system of claim 6, wherein said impact switch includes a plunger actuator mounted within said support member adjacent said expellable panel whereby impact with said expellable panel causes said expellable panel to contact said plunger actuator thereby actuating said impact switch.

8. The air bag system of claim 7, wherein said support member is securable to an existing bumper of a vehicle.

* * * * *